United States Patent [19]
Kato et al.

[11] Patent Number: 5,214,690
[45] Date of Patent: May 25, 1993

[54] FACSIMILE DEVICE

[75] Inventors: Sadamoto Kato, Tokyo; Hideyuki Suzuki; Motohiko Yamashita; Isao Ishigami, all of Kakegawa, all of Japan

[73] Assignee: Nec Corporation, Japan

[21] Appl. No.: 798,074

[22] Filed: Nov. 19, 1991

[30] Foreign Application Priority Data

Nov. 19, 1990 [JP] Japan .................................. 2-313735

[51] Int. Cl.⁵ ...................... H04M 11/00; H04M 3/42
[52] U.S. Cl. ...................................... 379/100; 379/93; 379/94; 379/212; 358/435; 358/400
[58] Field of Search .................... 379/100, 96, 97, 98, 379/94, 93, 210, 212, 279; 358/400, 402, 407, 434, 435, 436, 440

[56] References Cited

U.S. PATENT DOCUMENTS 4,994,926 2/1991 Gordon et al. ...................... 358/435
5,027,386 6/1991 Hisano ................................. 379/100

FOREIGN PATENT DOCUMENTS 0318456 12/1989 Japan .................................. 379/100

Primary Examiner—James L. Dwyer
Assistant Examiner—Jason Chan
Attorney, Agent, or Firm—Ostrolenk, Faber, Gerb & Soffen

[57] ABSTRACT

When a facsimile device connected to a telephone line detects a call from a remote station and seizes the line while it is short of paper or jammed, it does not connect the telephone line to an external or substitute facsimile device until it determines that the remote station desires to hold a facsimile communication therewith.

2 Claims, 3 Drawing Sheets

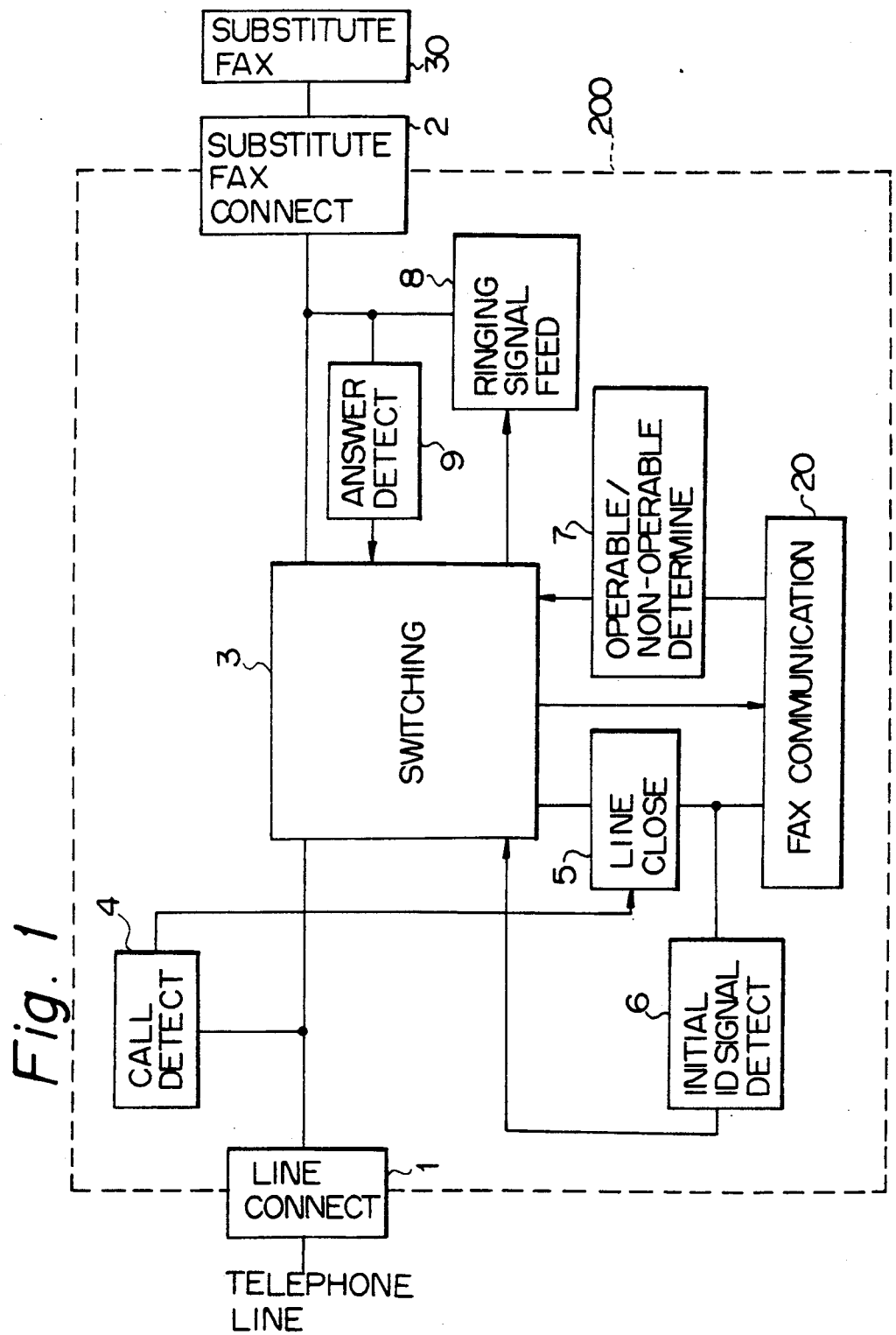

FACSIMILE DEVICE

BACKGROUND OF THE INVENTION

The present invention relates to a facsimile device and, more particularly, to a facsimile device capable of holding a communication without interruption even when a receiver thereof is defective.

A facsimile device being called by a remote facsimile device may be, and often is, short of paper, jammed by paper or a document to be transmitted, or otherwise defective. In such a condition, it has customarily been impossible for the calling facsimile device to start on a facsimile communication until the operator at the called facsimile device removes the defect.

In light of this, EP 0, 195258 A2 discloses a facsimile device having a memory circuit which stores the phone numbers of secondary receiving stations. When this type of facsimile device calls a remote facsimile device and detects non-connection due to the busy state or the error of the latter, it reads the phone number of a secondary receiving station out of the memory circuit to call the secondary receiving station. So long as the secondary or substitute facsimile station to be called is used as a spare receiver, the facsimile communication will be held with reliability. However, the phone numbers of the secondary receiving stations have to be registered at the memory circuit of the facsimile transmitter beforehand, requiring an agreement between the transmitting and receiving stations.

Japanese Patent Laid-Open Publication No. 209862/1989 teaches a facsimile device incorporating a switching circuit capable of switching the connection of a telephone line from the facsimile device to another facsimile device. When the facsimile device is unable to receive due to an error occurred therein, the error is detected to cause the switching circuit to automatically connect the telephone line to another or substitute facsimile device. This type of facsimile device has a problem that on the connection of the telephone line to the substitute facsimile device, the telephone line is entirely disconnected from the former, or main facsimile device, making functions available with the main facsimile device practically unusable. For example, when the main facsimile device has the function of an answering telephone, the person at the calling station cannot record his or her message in the answering telephone. Moreover, a telephone connected to the main facsimile device cannot be used at all.

SUMMARY OF THE INVENTION

It is, therefore, an object of the present invention to provide a facsimile device which does not connect the associated telephone line to a substitute facsimile device even if it is short of paper, jammed or otherwise defective until it determines, after detecting a call and seizing the line, that a calling facsimile device desires to hold a communication therewith.

It is another object of the present invention to provide a generally improved facsimile device.

A facsimile device of the present invention comprises line connecting means connecting to a telephone line, substitute connecting means connecting to an external substitute facsimile device, a facsimile communication section, switching means for selectively setting up a communication path between a remote facsimile station connected to the telephone line and the facsimile communication section or between the remote facsimile station and the substitute facsimile device connected to the substitute connecting means, call detecting means for automatically detecting an incoming call from the telephone line, line closing means for closing the communication path to the telephone line on receiving call detection information from the call detecting means, initial identification (ID) signal detecting means for determining whether or not an initial ID signal for facsimile communication has been received over the telephone line, operable/non-operable determining means for determining whether or not the facsimile communication section is ready to operate, ringing feeding means for feeding a ringing to the substitute facsimile device to start the substitute facsimile device via the external terminal connecting means, and answer detecting means for detecting an answer of the substitute facsimile device to the ringing.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing a facsimile device embodying the present invention.

DESCRIPTION OF THE PREFERRED EMBODIMENT

Figure 2A:
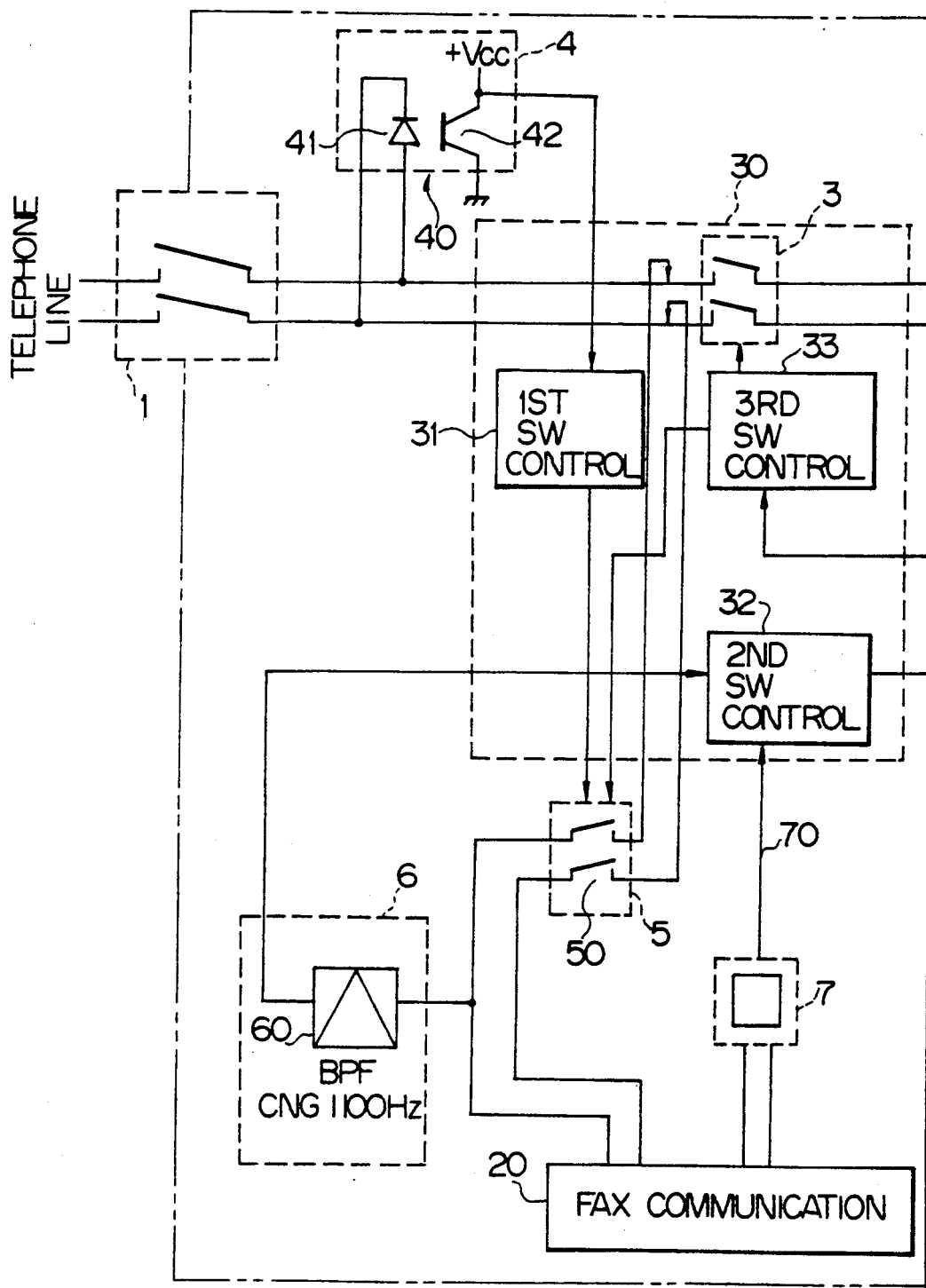
FIGS. 2A and 2B are diagrams showing a more specific arrangement of the facsimile device of FIG. 1.

Referring to FIG. 1 of the drawings, a facsimile device embodying the present invention is shown and generally designated by the reference numeral 200. As shown, the facsimile device 200 has line connecting means 1, substitute connecting means 2, switching means 3, call detecting means 4, line closing means 5, initial identification (ID) signal detecting means 6, operable/non-operable determining means 7, ringing feeding means 8, and answer detecting means 9. The line connecting means 1 is connected to a telephone line while the substitute connecting means 2 is connected to an external substitute facsimile device 30. While the facsimile device 200 has both a switching function and a facsimile communicating function, a section 20 serving the facsimile communicating function may be implemented by an independent unit.

When a ringing comes in via the line connecting means 1 which is connected to the telephone line, the call detecting means 4 detects it and commands the line closing means 5 to send an answer over the telephone line. As soon as the line closing means 5 closes the line, an exchange, not shown, also connected to the telephone line stops sending the ringing to the facsimile device 200. At the same time, the initial ID signal detecting means 6 determines whether or not an initial ID signal (CNG signal) is sent from the remote facsimile station, reporting the result of decision to the switching means 3. The CNG signal repetitively occurs at the intervals of 3.5 seconds, as prescribed by CCITT Rec. T.30; when the transmitting station does not detect an answer on the lapse of 35 seconds, it disconnects the line. The oprable/non-operable determining means 7 has sensors to determine whether or not the built-in facsimile communication section 20 is operable, i.e., whether or not an error such as a paper jam or the shortage of paper has occurred, reporting the result of decision to the switching means 3.

Assume that the built-in facsimile communication section 20 is ready to operate, as determined by the operable/non-operable determining means 7, when an initial ID signal or CNG signal for facsimile communication is detected by the detecting means 6. Then, the switching means 3 connects the communication path extending from the telephone line to the facsimile communication section 20 and delivers a start command to the section 20. In this condition, the facsimile communication section 20 starts communicating with the calling facsimile station over the telephone line.

Even when the facsimile communication section 20 is not operable as determined by the determining means 7, the telephone line is held in connection to the section 20 if a CNG signal is not detected by the initial ID signal detecting means 6. Then, the caller may record a message or a particular message may be sent over the telephone line, by using a function other than the facsimile communication function, e.g., an answering telephone function.

Assume that the built-in facsimile communication section 20 is not operable when a CNG signal is detected. Then, the switching means 3 commands the ringing feeding means 8 to feed a ringing to the external or substitute facsimile device 30 which is connected to the substitute connecting means 2. In response, the substitute facsimile device 30 sets up a DC loop. The answer detecting means 9 reports such a state of the substitute facsimile device 30 to the switching means 3, allowing the switching means 3 to see the answer of the device 30. Then, the switching means 3 switches the communication path extending from the telephone line to the substitute facsimile device 30. In this condition, the facsimile device 30 holds a facsimile communication with the calling station over the telephone line.

As stated above, when the built-in facsimile communication section 20 is not operable because, for example, it is short of paper, the embodiment automatically causes the external facsimile device 30 to act for the section 20.

Figure 2B:
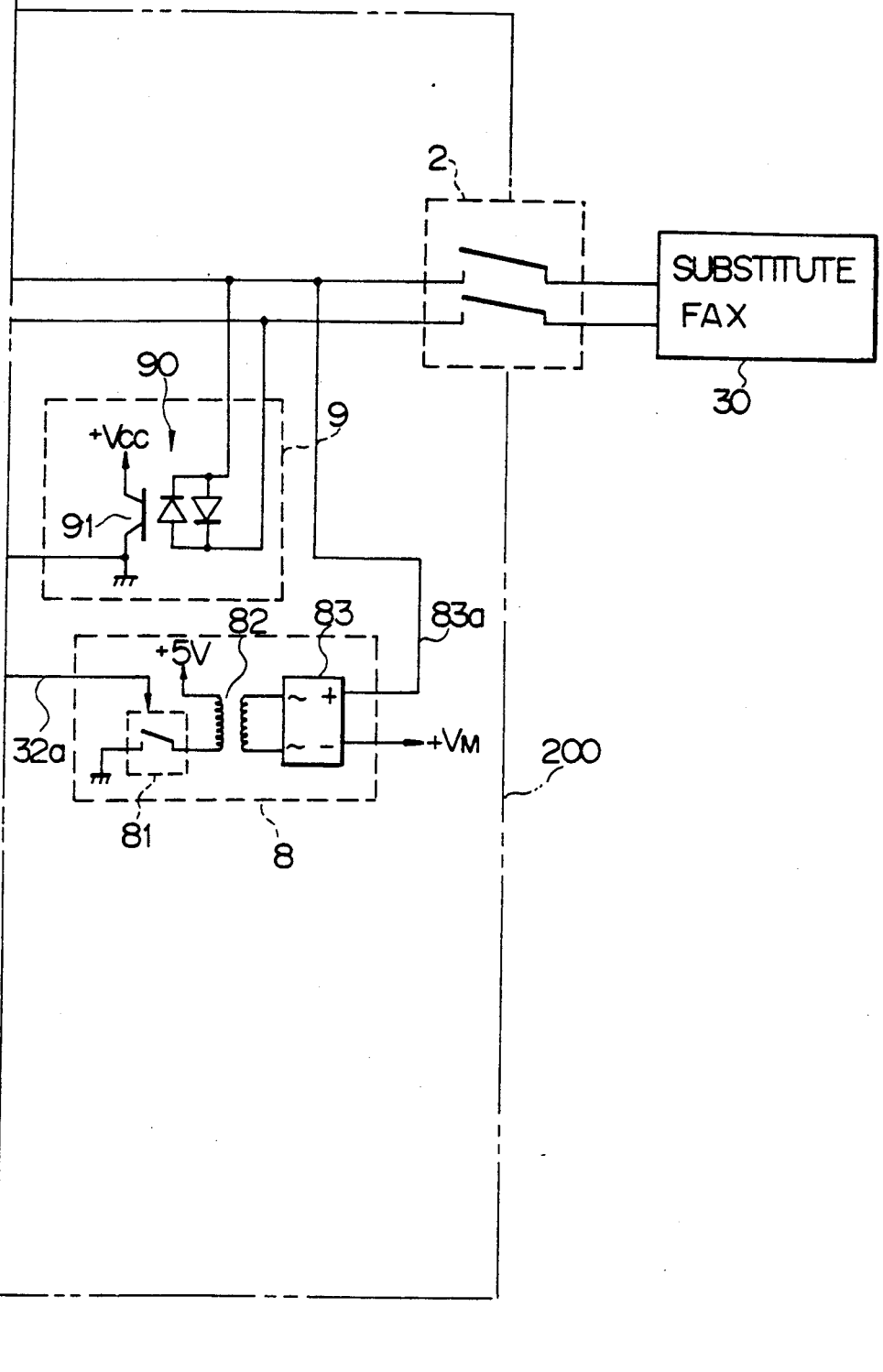

A more specific construction of the facsimile device 200 will be described with reference to FIG. 2. In FIG. 2, as a ringing arrives at the line connecting means 1, the call detecting means 4 detects it by a photocoupler 40 which is made up of a photodiode 41 and a phototransistor 42. Connected to the telephone line, the photodiode 41 emits light in response to the ringing having a peak voltage of 48 volts and a frequency of 16 hertz, thereby turning on the phototransistor 42. The switching means 3 has a switch 30 and a first to a third switch control 31, 32 and 33. When the phototransistor 42 of the call detecting means 4 is turned on, the first switch control 31 closes switches 50 of the line closing means 5. As a result, the telephone line is connected to the built-in communication section 20 and seized. This causes the exchange, not shown, connected to the telephone line to stop sending the ringing to the facsimile device 200.

The initial ID signal detecting means 6 is constituted by a band-pass filter 60 for separating a CNG signal whose frequency is 1100 hertz. When this detecting means 6 detects a CNG signal after the line has been closed, it reports the arrival of a CNG signal to the second switch control 32 of the switching means 3. On the other hand, when the operable/non-operable determining means 7 determines that, for example, the built-in communication section 20 is short of paper or jammed, it delivers alarm information 70 to the second switch control 32. Assume that the second switch control 32 has received such reports from both the initial ID signal detecting means 6 and the operable/non-operable determining means 7. Then, the switch control 32 generates a control signal 32a for closing a switch 81 included in the ringing feeding means 8. As the switch 81 is closed, a transformer 82 also included in the ringing feeding means 8 boosts 5 volts to 48 volts to thereby energize a 16 hertz oscillator 83. As a result, the oscillator 83 generates a ringing 83a having a peak voltage of 48 volts and a frequency of 16 hertz and sends it to the external facsimile device 30. This ringing is almost the same as the ringing which arrives at the line connecting means 1 over the telephone line. When the substitute facsimile device 30 sets up a DC loop in response to the ringing, a photocoupler 90 included in the answer detecting means 9 turns on an output transistor 91 thereof. Consequently, the third switch control 33 closes the switch 30 and then opens the switch 50 of the line closing means 5 immediately.

In the illustrative embodiment, if the switching means 3 closes the switch 30 thereof within 35 seconds after the transmission of a CNG signal from the calling station and thereby allows the substitute facsimile terminal 30 to answer to the CNG signal, the transmitting function is handed over from the built-in communication section 20 to the substitute device 30.

Various modifications will become possible for those skilled in the art after receiving the teachings of the present disclosure without departing from the scope thereof.

What is claimed is:

1. A facsimile device comprising:
   line connecting means connecting to a telephone line;
   substitute connecting means connecting to an external substitute facsimile device;
   a facsimile communication section;
   switching means for selectively setting up a communication path between a remote facsimile station connected to said telephone line and said facsimile communication section or between said remote facsimile station and said substitute facsimile device connected to said substitute connecting means;
   call detecting means for automatically detecting an incoming call from said telephone line;
   line closing means for closing the communication path to said telephone line on receiving call detection information from said call detecting means;
   initial identification (ID) signal detecting means for determining whether or not an initial ID signal for facsimile communication has been received over said telephone line;
   operable/non-operable determining means for determining whether or not said facsimile communication section is ready to operate;
   ringing feeding means for feeding a ringing to said substitute facsimile device to start said substitute facsimile device via said substitute connecting means; and
   answer detecting means for detecting an answer of said substitute facsimile device to said ringing.

2. A device as claimed in claim 1, wherein when said initial ID signal detecting means and said operable/non-operable determining means report said switching means the reception of said initial ID signal and the non-operable state of said facsimile communication section, respectively, said switching means commands said ringing feeding means to feed a ringing to said substitute facsimile device and then, when said substitute facsimile device returns said answer as determined by said answer detecting means, connects said substitute facsimile device to said telephone line, instead of starting said facsimile communication section.

* * * * *